United States Patent Office 3,442,865
Patented May 6, 1969

3,442,865
PROCESS FOR THE MANUFACTURE OF FLUORINE-CONTAINING COPOLYMERS OF TRIOXANE
Klaus Weissermel, Kelkheim, Taunus, Karl-Heinz Häfner, Bad Orb, and Klemens Gutweiler, and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 8, 1966, Ser. No. 541,112
Claims priority, application Germany, Apr. 24, 1965, F 45,896
Int. Cl. C08g 1/12
U.S. Cl. 260—67                    5 Claims

ABSTRACT OF THE DISCLOSURE

Polyoxmethylene copolymers having improved adherence to metals are disclosed. The polmers may be prepared by copolymerizing 70 to 99.5% by weight, based on the total weight of monomer, of trioxane and 0.5 to 20% by weight of a fluorine-containing cyclic ether of the general formula:

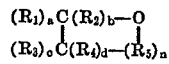

wherein $R_1$ and $R_2$ are aliphatic hydrocarbon radicals containing 1 to 10 fluorine atoms and 1 to 10 carbon atoms and in which the hydrocarbon chains of the hydrocarbon radicals may (A) be interrupted by 1 to 3 oxygen atoms, (B) comprise a 4- to 6-membered hydrocarbon ring and (C) contain chlorine atoms; $R_2$ and $R_4$ are hydrogen or an alkyl group of 1 to 2 carbon atoms; $R_5$ is methylene, oxymethylene, —$CH_2OCH_2$— or —$CH_2CH_2$—O—$CH_2$; $a$, $b$, $c$ and $d$ are 0 to 2, the sum of $a+c$ being 1 or 2 and the sum of each of $a+b$ and $c+d$ being 2; and $n$ is 1 to 3. The polymerization reaction mixture may contain from 0 to 10% by weight of a flourine-free cyclic ether.

---

The present invention relates to a process for the manufacture of flourine-containing copolymers of trioxane.

It is known that copolymers of trioxane with cyclic ethers possess great hardness, toughness and thermal stability and can be processed by injection-molding or extrusion processes into shaped articles which can be exposed to high mechanical stress. Owing to the poor adhesion to metals, the copolymers have hitherto not been used for coating metals.

Now we have found that trioxane copolymers which adhere well to metals can be prepared advantageously by polymerizing mixtures comprising 70 to 99.5 percent by weight, calculated on the monomer mixture, of trioxane, 0 to 10 percent by weight of cyclic ethers and 0.5 to 20 percent by weight of flourine-containing cyclic ethers in known manner.

As fluorine-containing cyclic ethers there are used compounds of the formula

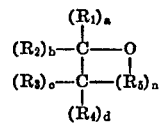

wherein $R_1$ and $R_3$ are aliphatic hydrocarbon radicals containing 1 to 10 fluorine atoms and 1 to 10 carbon atoms and in which the hydrocarbon chains of the hydrocarbon radicals may (A) be interrupted by 1 to 3 oxygen atoms, (B) comprise a 4- to 6-membered hydrocarbon ring and (C) contain chlorine atoms; $R_2$ and $R_4$ are hydrogen or an alkyl group of 1 to 2 carbon atoms $R_5$ is methylene, oxymethylene, —$CH_2OCH_2$— or

—$CH_2CH_2$—O—$CH_2$—;

$a$, $b$, $c$ and $d$ represent as indices 0 or the whole number 1 or 2, the sum $a+c$ being 1 or 2 and the sum of each of the pairs $a+b$ and $c+d$ being 2, $n$ represents as index 0 and a whole number from 1 to 3. The compounds are added in an amount within the range of from 0.1 to 20 percent by weight, calculated on the total charge.

As fluorine-containing cyclic ethers there may be used, for example: 2-fluorethyl glycidyl ether, 2-fluoro-1-methyl-ethyl-glycidyl ether, 2-fluoro-1-fluoromethyl-ethyl glycidyl ether, 2-fluoro-1-chloromethyl-ethyl glycidyl ether, 2-fluoro-1, 1-dimethyl-ethyl glycidyl ether, 1,1,2,2-tetra-fluor-ethyl glycidyl ether, 2,2,3,3-tetrafluoropropyl glycidyl ether, perfluorovinyl glycidyl ether, 1,2,2-trifluoro-1-chlorethyl glycidyl ether, 2,2-difluoro-1-chloro-vinyl glycidyl ether, 1,2,3,3,3-pentafluoro-propylene glycidyl ether, 2,2,3,3,4,4,5,5-octafluoro-pentyl glycidyl ether, 1,3-dioxolano-4-oxymethyl-1,2,2-trifluoro-1-chlorethyl glycidyl ether, 1,3-dioxa-4-(oxymethyl-1,1,2,2-tetrafluor-ethyl)-cycloheptane, 1,1,2,2-tetrafluoro-3-epoxycyclobutane, (1-methyl-2,2,3,3-tetrafluorocyclobutyl-1-oxymethyl) glycidyl ether, 5,5 - di - ($\alpha,\alpha$-difluoro-$\beta$-chloro-$\beta$-fluoro-ethoxy methyl)-1,3-dioxane, p - glycidoxy-trifluoro-methyl-benzene, 1-glycidoxy-2,4-di(trifluoromethyl)-benzene.

The fluorine-containing cyclic ethers are preferably applied in an amount within the range of from 0.5 to 20 percent by weight, especially in an amount within the range of from 1 to 10 percent by weight, calculated on the total monomer mixture.

It is also possible to carry out the polymerization with the addition of 0 to 10 percent by weight, calculated on the total monomer mixture, of monomers which are copolymerizable with trioxane. Suitable monomers are, for example, cyclic ethers, for example ethylene oxide, propylene oxide, epichlorhydrin, 1,4-butandiolformal, diethylene glycol formal, 1,4-butendiolformal, 1,4-butandiol diglycidyl ether, oxacyclobutane and 1,3-dioxolane.

The polymerization can be carried out according to procedures that are known per se in the melt, in solution or in suspension. As solvents or dispersing agents for the monomers and the catalyst there may be used inert aliphatic or cycloaliphatic hydrocarbons containing 6 to 18 carbon atoms, for example n-hexane or cyclohexane. The polymerization proceeds in an especially smooth manner in the melt at temperatures within the range of from +60° to +110° C. It is possible, in this method, to polymerize trioxane and the fluorine-containing cyclic ethers simultaneously, or to polymerize first only the fluorine-containing cyclic ethers and then to continue the polymerization with the addition of trioxane.

The polymerization can be started by known cationically active catalysts, for example Lewis acids (for the definition of the Lewis acids cf. Kortüm, "Lehrbuch der Elektrochemie," Wiesbaden 1948, pp. 300 to 301), preferably borontrifluoride. The latter is preferably applied in the form of its complex compounds, for example as etherate or aryldiazonium fluoborate. Instead of the Lewis acids, their etherates or oxonium salts, there may also be used other cationically active substances, for example inorganic and organic acids, for example perchloric acid, hexachloro-stannic acid, heptafluoro-p-toluol sulfonic acid, trifluoro-methane sulfonic acid in order to start the polymerization.

The concentration of the catalysts depends primarily on their activity and may be within the range of from 0.0001 to 1 percent by weight, calculated on the total monomer mixture.

In order to remove the unstable semi-acetal terminal groups, the copolymers may be subjected in known manner to an alkaline decomposition (cf. Belgian Patent 617,897). It is advantageous to add to the copolymers known heat stabilizers and oxidation inhibitors (cf. German Auslegeschriften 1,104,695 and 1,129,689).

When melted on sheet iron or sheets of stainless steel, the copolymers yield rigid and very adhesive coatings which can only be removed mechanically, for example by grinding with emery. The known homo- and copolymers of trioxane, however, can be removed from the metal surface in the form of a coherent film.

The copolymers are thermostable and can be shaped in the thermoplastic state. They may be used especially for the coating of metals according to the whirl-sintering process, as well as thermoplastic adhesives for metals.

The following examples serve to illustrate the invention, but they are not intended to limit it thereto:

EXAMPLE 1

5 ml. $BF_3$-di-n-butyl etherate/cyclohexane (1:40) were added to 90 grams trioxane and 10 grams 1,1,2,2-tetrafluoro-3-epoxy-cyclobutane corresponding to the formula $$\begin{array}{c} CH_2-CH-CH-CH_2 \\ | \quad | \quad \diagdown O \diagup \\ CF_2-CF_2 \end{array}$$

and the batch was polymerized in a closed vessel in a bath which had a constant temperature of 70° C. Polymerization took place within 1 to 3 minutes. After an after-polymerization period of 60 minutes, the polymer block was comminuted. Then the polymer was treated at 150° C. for a period of 30 minutes in benzyl alcohol containing 1% by volume of ethanolamine to remove all unstable portions and residual monomers. The polymer which had precipitated from the benzyl alcohol after cooling was filtered off with suction, boiled several times with methanol and dried under reduced pressure at a temperature within the range of from 50° to 70° C. The yield of polymer amounted ot 55 grams.

A test portion of the polymer was additionally stabilized with 0.7% by weight of 2,2-methylene-bis-4-methyl-6-tert. butyl-phenol and 0.2% by weight of dicyan diamide and subjected to a thermal degradation at 230° C. during the course of 45 minutes. The loss of weight ($K_D$) amounted to 0.0209% per minute.

The polymer had a reduced specific viscosity $\eta_{red}=0.22$ (50 mg. of the polymer were dissolved in 10 ml. butyrolactone containing 0.2% by weight dicyandiamide at 140° C. and its viscosity was measured at this temperature). On analysis it was found that the polymer, which exhibited a very good adhesion to metal, contained 3.5% by weight of fluorine.

EXAMPLE 2

In a manner analogous to that described in Example 1, 97 grams trioxane and 3 grams 1,1,2,2-tetrafluoro-3-epoxy-cyclobutane were copolymerized in the presence of 1 ml. $BF_3$-di-n-butyletherate/cyclohexane (1:80) as a catalyst. After the treatment according to Example 1, the yield of polymer amounted to 54 grams. The following values were measured on the polymer:

$\eta_{red}$: 0.52,
$K_D$: 0.0437% per minute.

EXAMPLE 3

In a manner analogous to that described in Example 1, 975 grams trioxane, 20 grams ethylene oxide and 5 grams 1,1,2,2 - tetrafluoro - 3 - epoxycyclobutane were copolymerized in the presence of 10 ml. $BF_3$-di-n-butyletherate/cyclohexane (1:40). After the treatment according to Example 1, the yield of polymer amounted to 760 grams. A melting index $i_2=16.3$ grams/10 minutes was measured on the polymer. (ASTM–D1238–52T).

EXAMPLE 4

In a manner analogous to that described in Example 1, 950 grams trioxane, 20 grams ethylene oxide and 30 grams 1,1,2,2-tetrafluor-3-epoxycyclobutane were copolymerized in the presence of 5 ml. $BF_3$-di-n-butyletherate/cyclohexane (1:40). After the treatment according to Example 1, the yield of polymer amounted to 660 grams. The following values were measured on the polymer:

$\eta_{red}$: 0.38,
$K_D$: 0.033% per minute.

EXAMPLE 5

In a manner analogous to that described in Example 1, 80 grams trioxane, 2 grams ethylene oxide and 18 grams 5,5 - di($\alpha,\alpha$ - difluoro - $\beta$ - chloro - $\beta$ - fluoro - ethoxymethyl)-1,3-dioxane corresponding to the formula $$\begin{array}{c} F \qquad\qquad\qquad\qquad\qquad F \\ | \qquad\qquad\qquad\qquad\qquad | \\ HC-CF_2-O-H_2C \diagdown \quad CH_2O-CF_2-CH \\ \qquad\qquad\qquad C \qquad\qquad\qquad | \\ Cl \qquad\qquad H_2C \diagup \diagdown CH_2 \qquad Cl \\ \qquad\qquad\qquad O \qquad O \\ \qquad\qquad\qquad\quad \diagdown \diagup \\ \qquad\qquad\qquad\qquad CH_2 \end{array}$$

were copolymerized in the presence of 12 mg. p-nitrophenyl-diazonium fluoborate as a catalyst. The polymerization period amounted to 30 minutes. After the treatment according to Example 1, the yield of copolymer was 61 grams. The following values were measured on this copolymer which exhibited a very good adhesion to metal:

$\eta_{red}$: 0.37,
$K_D$: 0.036% per minute.

We claim:
1. A process for making a polyoxymethylene copolymer which exhibits good adhesion to metals which comprises copolymerizing from 70 to 99.5% by weight, based on the total weight of monomer, of trioxane, 0 to 10% by weight of a fluorine-free cyclic ether and 0.5 to 20% by weight of a fluorine-containing cyclic ether of the general formula

$$\begin{array}{c} (R_1)_a \\ | \\ (R_2)_b-C-O \\ | \quad | \\ (R_3)_c-C-(R_5)_n \\ | \\ (R_4)_d \end{array}$$

wherein $R_1$ and $R_3$ are aliphatic hydrocarbon radicals containing 1 to 10 fluorine atoms and 1 to 10 carbon atoms and in which the hydrocarbon chains of the hydrocarbon radicals may (A) be interrupted by 1 to 3 oxygen atoms, (B) comprise a 4- to 6-membered hydrocarbon ring and (C) contain chlorine atoms; $R_2$ and $R_4$ are hydrogen or an alkyl group of 1 to 2 carbon atoms; $R_5$ is methylene, oxymethylene, —$CH_2OCH_2$— or —$CH_2CH_2$—O—$CH_2$—;

$a$, $b$, $c$ and $d$ are 0 to 2, the sum of $a+c$ being 1 or 2 and the sum of each of $a+b$ and $c+d$ being 2; and $n$ is 0 to 3.

2. A process according to claim 1 wherein the fluorine-containing ether is 1,1,2,2-tetrafluoro-3-epoxy-cyclobutane.

3. A process according to claim 1 wherein the fluorine-containing ether is 5,5-di($\alpha,\alpha$-difluoro-$\beta$-chloro-$\beta$-fluoro-ethoxymethyl)-1,3-dioxane.

4. A polyoxymethylene copolymer having good adhesion to metals consisting essentially of 70 to 99.5% by weight of oxymethylene units derived from trioxane and 0.5 to 20% by weight of units derived from a fluorine-containing cyclic ether of the general formula:

$$\begin{array}{c} (R_1)_a \\ | \\ (R_2)_b-C-O \\ | \quad | \\ (R_3)_c-C-(R_5)_n \\ | \\ (R_4)_d \end{array}$$

wherein $R_1$ and $R_3$ are aliphatic hydrocarbon radicals containing 1 to 10 fluorine atoms and 1 to 10 carbon atoms and in which the hydrocarbon chains of the hydrocarbon radicals may (A) be interrupted by 1 to 3 oxygen atoms, (B) comprise a 4- to 6-membered hydrocarbon ring and (C) contain chlorine atoms; $R_2$ and $R_4$ are hydrogen or an alkyl group of 1 to 2 carbon atoms; $R_5$ is methylene, oxymethylene, —$CH_2OCH_2$— or —$CH_2CH_2$—O—$CH_2$—;

$a$, $b$, $c$ and $d$ are 0 to 2, the sum of $a+c$ being 1 or 2 and the sum of each of $a+b$ and $c+d$ being 2; and $n$ is 0 to 3.

5. A polyoxymethylene copolymer having good adhesion to metals consisting essentially of 70 to 99.5% by weight of oxymethylene units derived from trioxane, 0 to 10% by weight of units derived from a fluorine-free cyclic ether and 0.5 to 20% by weight of units derived from a fluorine-containing cyclic ether of the general formula:

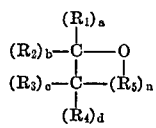

wherein $R_1$ and $R_3$ are aliphatic hydrocarbon radicals containing 1 to 10 fluorine atoms and 1 to 10 carbon atoms and in which the hydrocarbon chains of the hydrocarbon radicals may (A) be interrupted by 1 to 3 oxygen atoms, (B) comprise a 4- to 6-membered hydrocarbon ring and (C) contain chlorine atoms; $R_2$ and $R_4$ are hydrogen or an alkyl group 1 to 2 carbon atoms; $R_5$ is methylene, oxymethylene, —$CH_2OCH_2$— or —$CH_2CH_2$—O—$CH_2$—;

$a$, $b$, $c$ and $d$ are 0 to 2, the sum of $a+c$ being 1 or 2 and the sum of each of $a+b$ and $c+d$ being 2; and $n$ is 0 to 3.

References Cited

UNITED STATES PATENTS 3,072,609 1/1963 Berardinelli et al. _____ 260—67
3,275,604 9/1966 Kray et al. _____ 260—67

OTHER REFERENCES

Jones et al.: Journal of Polymer Science, vol. XXVI, pp. 81–88 (1957).

Ishida et al.: Ibid., vol. XL No. 137, pp. 571–573 (1959).

WILLIAM H. SHORT, *Primary Examiner.*

L. M. PHYNES, *Assistant Examiner.*

U.S. Cl. X.R.

260—2, 88.3